US006815634B2

United States Patent
Sonoda et al.

(10) Patent No.: US 6,815,634 B2
(45) Date of Patent: Nov. 9, 2004

(54) LASER WELDING EQUIPMENT AND LASER WELDING PROCESS

(75) Inventors: Hirobumi Sonoda, Narashino (JP); Kenji Okuyama, Narashino (JP); Junichi Ibukuro, Narashino (JP); Takanori Yahaba, Wako (JP); Masato Takikawa, Wako (JP); Yasutomo Ichiyama, Futtsu (JP); Toshiyasu Ukena, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/413,131

(22) Filed: Apr. 15, 2003

(65) Prior Publication Data

US 2004/0099642 A1 May 27, 2004

(30) Foreign Application Priority Data

Apr. 15, 2002 (JP) .................................. 2002-111730

(51) Int. Cl.⁷ ........................ B23K 26/20; B23K 26/24
(52) U.S. Cl. ........................... 219/121.63; 219/121.76
(58) Field of Search ................. 219/121.63, 121.64, 219/121.65, 121.66, 121.67, 121.68, 121.69, 121.72, 121.76

(56) References Cited

U.S. PATENT DOCUMENTS 5,216,220 A * 6/1993 Davis et al. ........... 219/121.63
5,536,915 A * 7/1996 Peru et al. ............. 219/121.63

FOREIGN PATENT DOCUMENTS

DE          4403999 A1  *  8/1995
JP        57149083 A    *  9/1981

\* cited by examiner

Primary Examiner—Samuel M. Heinrich
(74) Attorney, Agent, or Firm—Arent Fox PLLC

(57) ABSTRACT

In order to implement lamination welding in which there is little distortion and the bonding strength is high by means of laser beam, a laser welding device comprises: a first laser beam emitting head directed to a layered base material composed of two or more layers in a superimposed direction; a first skirting roller rotatably supported by means of a first supporting member on which the first laser beam emitting head is fixed and provided with a peripheral surface which protrudes more at a base material side than a base material opposing end of the first laser beam emitting head; a second laser beam emitting head directed to the layered base material from the opposite side of the first laser beam emitting head in the superimposed direction; a second skirting roller rotatably supported by means of a second supporting member 14 on which the second laser beam emitting head is fixed and provided with a peripheral surface which protrudes more at a base material side than a base material opposing end of the second laser beam emitting head; and a first pressing means for pressing the first supporting member with respect to a supporting base holder in the superimposed direction.

7 Claims, 5 Drawing Sheets

LASER WELDING EQUIPMENT AND LASER WELDING PROCESS

BACKGROUND OF THE INVENTION

1. Field of the Invention

The present invention relates to laser welding techniques by which a layered base material composed of two or more layers is integrally bonded by welding to form a laminated bonded material, and in particular, relates to laser welding techniques by which three or more plates are stacked in a laminated state so as to be integrally bonded, although the scope of the invention is not limited thereto.

2. Description of the Related Art

YAG laser welding has characteristics described below and has been widely employed in automatic welding such as for automobiles.

(1) Convergent laser light can be produced and low distortion and high speed welding are possible.

(2) Since the laser light absorption factor thereof in a metal material is several times that of a $CO_2$ laser beam, high efficiency welding is possible. Furthermore, since the wavelength is one-tenth that of a $CO_2$ laser beam, it is not significantly influenced by plasma generated during welding.

(3) Since laser light can be transmitted by means of a flexible optical fiber, manipulation is easy and a multi-jointed robot can be utilized. Furthermore, it can be transmitted to a place distanced up to about 100 m distant therefrom.

(4) Since in laser light, time sharing and power sharing are possible, by using it at a plurality of work stations, a high utilization efficiency can be obtained.

However, there are problems in the welding in which a YAG laser beam alone is used, as described below.

(1) In a YAG laser beam, a light beam is focused to increase energy concentration, thereby executing welding. However, since the focused light spot diameter is 0.3 to 1 mm, which is very small, in lamination welding, the bonding interface width of a through bead from an upper plate to a lower plate is narrow, and thus the bonding strength is not high. In the case where lamination welding of three or more layers is implemented, there are cases in which welding is performed from one side (for example, from a front side) and where welding is performed from both sides, one surface each time, while the process speed is reduced. In either case, a long processing time is required, and the lowest plate tends to be deformed due to heat distortion during welding, whereby satisfactory welding cannot be obtained.

(2) Since the initial cost of a YAG laser welding device is high, in the case where plural pieces of device are introduced, such as in an automobile production line, the cost of the device is enormous.

SUMMARY OF THE INVENTION

It is an object of the present invention to provide a lamination welding, using a laser beam, in which there is little distortion and the bonding strength is high.

A laser welding device according to the invention is characterized by comprising a first laser beam emitting head (9) directed to a layered base material (21) composed of two or more layers in a superimposed direction; a first skirting roller (8) rotatably supported by means of a first supporting member (4) on which the first laser beam emitting head is fixed and provided with a peripheral surface which protrudes more at a base material side than a base material opposing end of the first laser beam emitting head; a second laser beam emitting head (19) directed to the layered base material from the opposite side of the first laser beam emitting head in the superimposed direction; a second skirting roller (18) rotatably supported by means of a second supporting member (14) on which the second laser beam emitting head is fixed and provided with a peripheral surface which protrudes more in a base material side than a base material opposing end of the second laser beam emitting head; and a first pressing means (6) for pressing the first supporting member (4) with respect to a supporting base holder (2) in the superimposed direction (z).

To facilitate understanding, reference numerals shown in the accompanying drawings which denote corresponding or equivalent components in the embodiment described below are appended in parenthesis for reference. The following are described similarly thereto.

In the above-described device, the first pressing means (6) presses the first supporting member (4) in the superimposed direction (z) of the layered base material, and thus the first skirting roller (8) supported by means of the first supporting member (4) abuts the base material (21) to press the base material, whereby the base material (21) is pressed to abut the second skirting roller (18). That is, the base material (21) is pressed and sandwiched by the first skirting roller (8) and the second skirting roller (18). The first laser beam emitting head (9) and the second laser beam emitting head (19) emit laser beams so that fusion pools 32 and 33 going across a layered bonding portion are created as shown in FIG. 5A or FIG. 5B. At this time since the base material (21) is pressed by the first skirting roller (8) and the second skirting roller (18), adhesion of the layered bonding portion is excellent, and the fusion pools of the upper and lower two materials of the layered bonding portion are united, whereby welding with a high bonding strength can be achieved. Furthermore, since both the front side and the back side of the layered base material are supported by means of the skirting rollers, deformation of the respective layered plates is inhibited, and a lamination with an excellent finished form can be obtained.

In a preferred embodiment, the laser welding device according to the present invention further comprises a first head gap adjustment mechanism (7) for adjusting the position of a first roller supporting member (34) which rotatably supports the first skirting roller (8) in the superimposed direction (z) with respect to the first supporting member (4) and a second head gap adjustment mechanism (17) for adjusting the position of a second roller supporting member (35) which rotatably supports the second skirting roller (18) in the superimposed direction with respect to the second supporting member (14).

This enables the distances of the first and second laser beam emitting heads (9, 19), with respect to the layered base material (21) (laser focus position in the thickness direction of the base material), to be simply adjusted by means of the first and second head gap adjustment mechanisms (7, 17).

In a preferred embodiment, the laser welding device according to the present invention further comprises a second pressing means (16) for pressing the second supporting member (14) with respect to the base holder (3) in the superimposed direction (z).

Since this enables the respective emitting heads (9, 19) to approach the base material (21) from both the front side and the back side of the base material (21) at the same time, the relative positioning of both the emitting heads (9, 19) and the base material (21) in the superimposed direction (z) can be easily executed.

Furthermore, in a preferred embodiment of the laser welding device according to the present invention, the first supporting member (4) is supported by means of one end (2) of a U-shaped-supporting base holder (1) and the second supporting member (14) is supported by means of the other end thereof (3). With this structure, by operating the supporting base holder (1) to move both emitting heads (9, 19) at the same time, positioning with respect to the base material (21) can be executed.

Moreover, in a preferred embodiment of the laser welding device according to the present invention (FIG. 2), a cable (20) which transmits a laser beam to the second laser beam emitting head (19), an optical system (19a) which makes the laser beam emitted from the cable parallel, and one end of an expansion cylinder (23) are supported by means of a supporting base holder (22) which supports the first supporting member (4), and the direction of the laser beam is changed 90 degrees by means of a mirror (24) at the other end of the expansion cylinder and is further changed 90 degrees by means of another mirror (26) so that the laser beam is guided to a convergence optical system (19b) of the second laser beam emitting head (19). With this structure, since two cables (10, 20) which transmit laser beams to the first and second laser beam emitting heads (9, 19) exist at the front side in which the first laser beam emitting head (9) opposes, it is not necessary to dispose a cable at the back side.

Furthermore, in a preferred embodiment of the laser welding device according to the present invention (FIG. 3), a laser beam emitted from a laser beam transmitting cable (10) is made substantially parallel by means of an optical system (9a), the direction of a part thereof is changed 90 degrees by means of a half mirror (27) and is further changed 90 degrees by means of another mirror (29) so that the laser beam is guided to a convergence optical system (9b) of the first laser beam emitting head (9), and the direction of the laser beam which has passed through the half mirror (27) is changed 90 degrees by means of a mirror (24) and is further changed 90 degrees by means of another mirror (26) so that the laser beam is guided to a convergence optical system (19b) of the second laser beam emitting head (19). Since this enables one laser beam transmitting cable (10) to supply a laser beam to the first and second laser beam emitting heads (9, 19), cable disposition becomes simple.

In a preferred embodiment of the laser welding device according to the present invention (FIG. 4), a laser beam emitted from a laser beam transmitting cable (10) is divided into two by means of a beam splitter (30), the direction of one laser beam is changed 90 degrees by means of a mirror (31) and is further changed 90 degrees by another mirror (29) so that the laser beam is guided to an convergence optical system (9b) of the first laser beam emitting head (9), and the direction of the other laser beam is changed 90 degrees by means of a mirror (24) and is further changed 90 degrees by another mirror (26) so that the laser beam is guided to a convergence optical system (19b) of the second laser beam emitting head (19). Since this enables one laser beam transmitting cable (10) to supply a laser beam to the first and second laser beam emitting heads (9, 19), cable disposition becomes simple.

It is preferred that the laser beam used in the laser welding device according to the present invention be a YAG laser beam. This enables efficient welding. Furthermore, it is possible for a welding head to be placed at a distance from the laser light source, for example, supported by a robot arm, and connected to the laser light source by an optical fiber cable, whereby operability of the welding head is greatly improved.

A laser welding method according to the present invention is characterized by comprising the steps of sandwiching a layered base material (21) composed of two or more layers by means of skirting rollers (8, 18) and pressing the base material in a superimposed direction (z) and emitting a laser beam from a front side and a back side of the layered base material (21) in the superimposed direction (z) by means of a first laser beam emitting head (9) and a second laser beam emitting head (19) so that the front side and the back side of the base material (21a, 21c) are melted up to a layered bonding portion.

This enables interactions and effects of the present invention to be similarly obtained.

In the laser welding methods according to the present invention, it is preferred that, in the case in which fusion depths from the front side and the back side are not superimposed in the superimposed direction (z) (FIGS. 5A, 5C), target positions of the first laser beam emitting head (9) and the second laser beam emitting head (19) be made substantially the same (FIGS. 5A, 5C).

Furthermore, in the laser welding process according to the present invention, it is preferred that, in the case in which the fusion depths from the front side and the back side are superimposed in the superimposed direction (z), the target positions of the first laser beam emitting head (9) and the second laser beam emitting head (19) be shifted in a direction (x) which is perpendicular to the superimposed direction (z) so that fusion positions from the front side and the back side are not superimposed at the same time (FIGS. 5B, 5D).

Other objects and advantages of the invention will become more apparent from the description of the embodiment below with reference to the accompanying drawings.

BRIEF DESCRIPTION OF THE DRAWINGS

FIG. 5A is an x-z cross-sectional view showing a structural feature where the same positions in x and y directions are aimed at by means of both heads; FIG. 5B is an x-z cross-sectional view showing a structural feature where shifted positions in the x-direction are aimed at so that fusion pools do not continue; FIG. 5C is an y-z cross-sectional view of the structural feature shown in FIG. 5A; and FIG. 5D is an y-z cross-sectional view of the structural feature shown in FIG. 5B.

BEST MODES FOR CARRYING OUT THE INVENTION

First Embodiment

Figure 1:
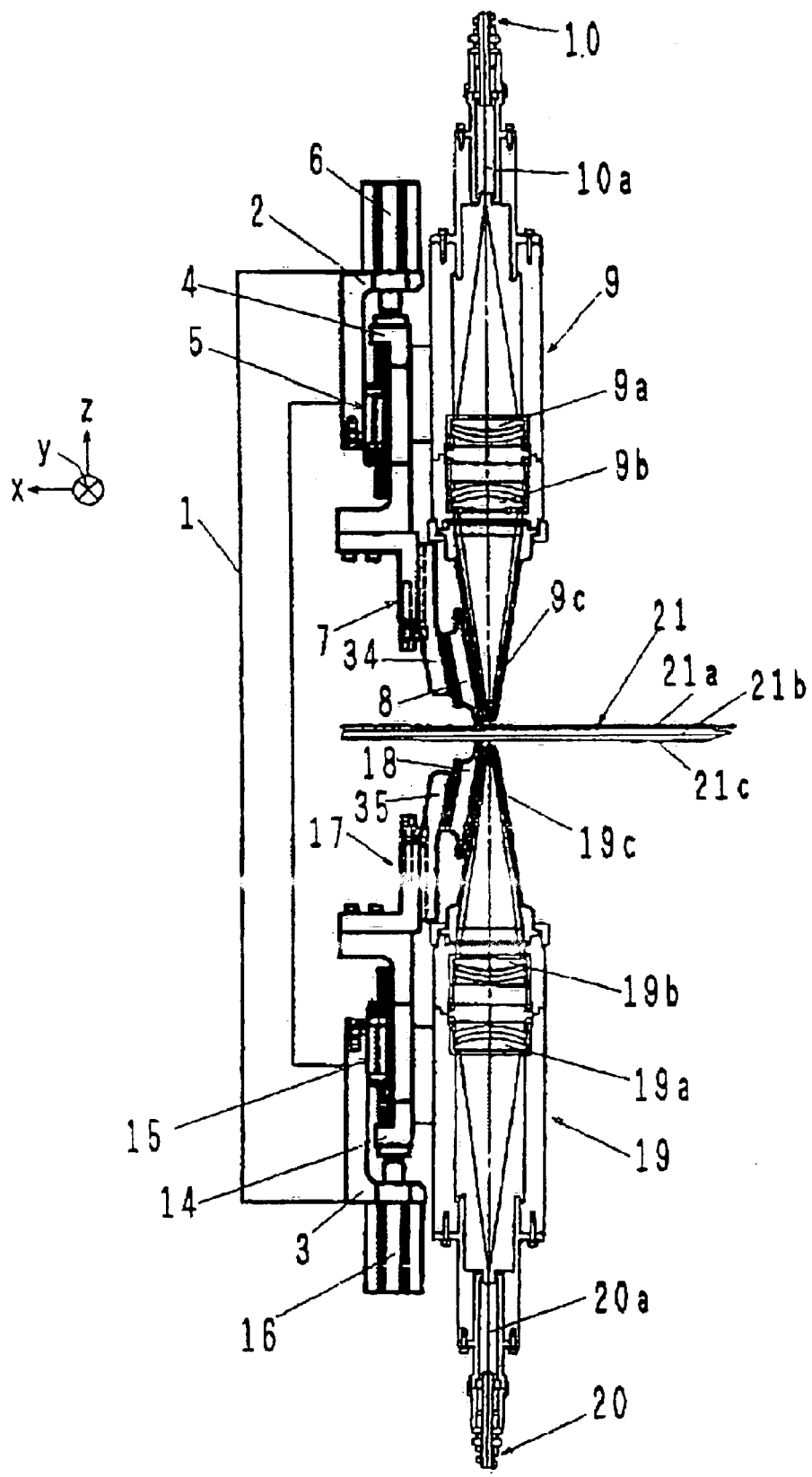
FIG. 1 is a vertical cross-sectional view of a first embodiment of the present invention.

FIG. 1 shows a first embodiment of the present invention. A base holder coupling frame 2 is provided on the upper end of a U-shaped supporting base holder 1, and a first supporting member 4 is supported on the base holder coupling frame 2 so as to be movable in a vertical direction z and to be immovable in horizontal directions x and y by means of a lifting guide 5. An air cylinder 6 is fixed on the base holder coupling frame 2, and the piston rod thereof is coupled with the first supporting member 4. When the air cylinder 6 pushes the piston rod, the first supporting member 4 descends, and when the piston rod is retracted, the first supporting member 4 ascends.

A first YAG laser beam emitting head 9 is fixed on the first supporting member 4. A roller supporting member 34 is supported on the first supporting member 4 via a gap adjustment mechanism 7. A skirting roller 8 is rotatably supported on the roller supporting member 34. Since a nozzle body 9c of the laser beam emitting head 9 is conical and is tapered downwardly where the lowest portion is a laser beam emitting nozzle, the axis of rotation of the skirting roller 8 tilts with respect to the horizontal plane (x) so that the outer surface of the layered base material 21 (hereinafter, simply referred to as a front) is pressed as close to the nozzle as possible by the outer peripheral surface of the skirting roller 8. When an adjustment screw of the gap adjustment mechanism 7 is turned clockwise, the roller supporting member 34 supporting the skirting roller 8 ascends, whereby the gap between the laser beam emitting nozzle of the laser beam emitting head 9 and the base material 21 surface becomes smaller. When the adjustment screw of the gap adjustment mechanism 7 is turned counterclockwise, the roller supporting member 34 supporting the skirting roller 8 descends, whereby the gap between the laser beam emitting nozzle of the laser beam emitting head 9 and the base material 21 surface becomes greater.

YAG laser beam emitted by a YAG laser light source (not shown) is supplied to the first YAG laser beam emitting head 9 by means of an optical fiber cable 10. The YAG laser beam emitted from an optical fiber 10a expands at a solid angle, converges through a lens 9a of an optical system to be substantially parallel, and converges through a lens 9b of a convergence optical system so as to be a point outside of the laser beam emitting nozzle of the laser beam emitting head 9, so that a highly concentrated convergent YAG laser beam hits the layered base material 21.

A second YAG laser beam emitting head 19, similar to the first laser beam emitting head 9, is supported upwardly on the bottom end of the supporting base holder 1 by means of a supporting structure similar to the supporting structure for the emitting head 9. When an air cylinder 16 fixed on a base holder coupling frame 3 on the bottom end of the supporting base holder 1 pushes the piston rod thereof, a second supporting member 14 ascends, and when the piston rod is retracted, the second supporting member 14 descends.

A roller supporting member 35 is supported on the second supporting member 14 via a gap adjustment mechanism 17, and a skirting roller 18 is rotatably supported on the roller supporting member 35. Since a nozzle body 19c of the laser beam emitting head 19 is conical and is tapered upwardly where the highest portion is a laser beam emitting nozzle, the axis of rotation of the skirting roller 18 tilts with respect to the horizontal plane (x) so that the lower side outer surface of the layered base material 21 (hereinafter, simply referred to as a back) is pressed as close to said nozzle as possible by the outer peripheral surface of the skirting roller 18. When an adjustment screw of the gap adjustment mechanism 17 is turned clockwise, the roller supporting member 35 supporting the skirting roller 18 descends, whereby the gap between the laser beam emitting nozzle of the laser beam emitting head 19 and the base material 21 surface becomes greater. When the adjustment screw of the gap adjustment mechanism 17 is turned counterclockwise, the roller supporting member 35 supporting the skirting roller 18 ascends, whereby the gap between the laser beam emitting nozzle of the laser beam emitting head 19 and the base material 21 surface becomes smaller.

YAG laser beam emitted by a YAG laser light source (not shown) is supplied to the second YAG laser beam emitting head 19 by means of an optical fiber cable 20. The YAG laser beam emitted from an optical fiber 20a expands at a solid angle, converges through a lens 19a of an optical system to be substantially parallel, and converges through a lens 19b of a convergence optical system so as to be a point outside of the laser beam emitting nozzle of the laser beam emitting head 19, so that a highly concentrated convergent YAG laser beam hits the layered base material 21.

Figure 5A:
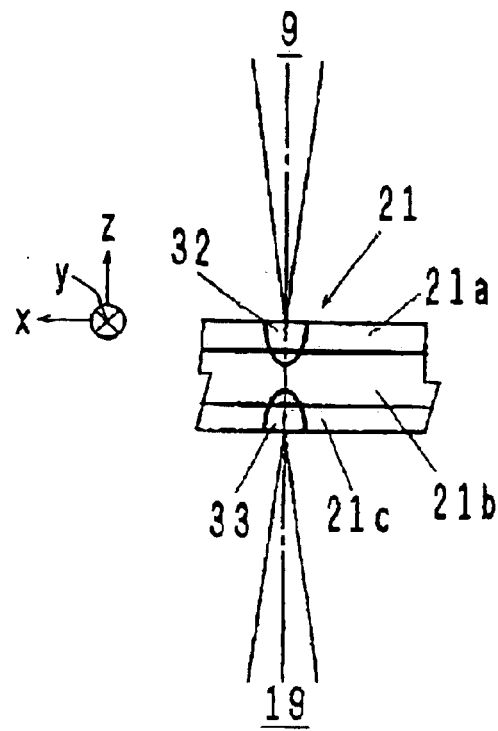
FIGS. 5A to 5D are views showing structural features of laser beam emission from heads 9 and 19 to a layered base material 21 by a laser welding process of the invention.
Figure 5B:
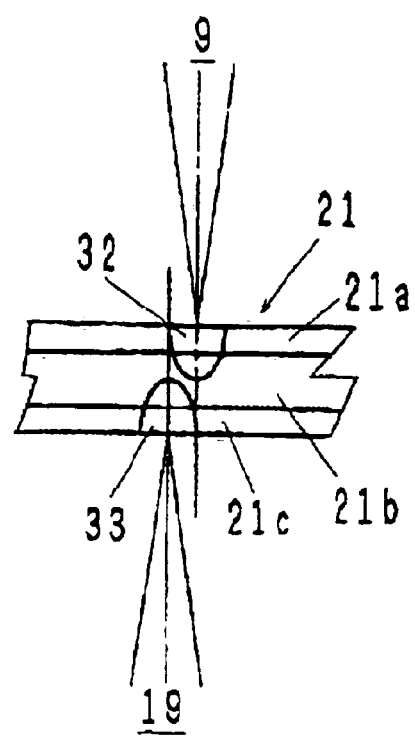
Figure 5C:
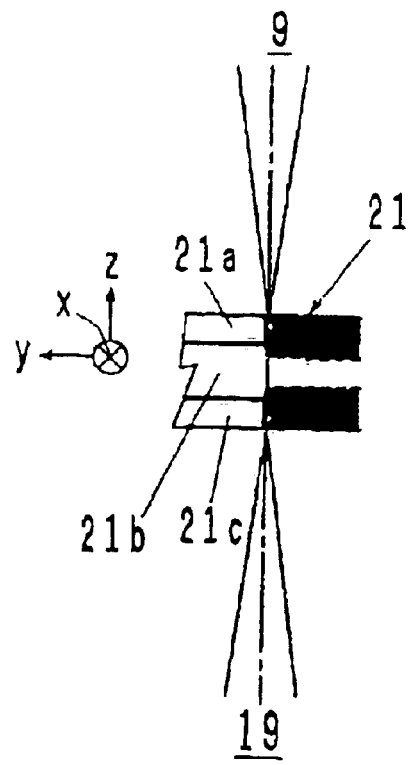

When high pressure air is supplied to the air cylinders 6 and 16 so as to push the piston rods, the first supporting member 4 is driven downwardly, and the second supporting member is driven upwardly, whereby the skirting rollers 8 and 18 press the layered base material 21 as shown in FIG. 1. The layered base material 21 is, for example, one in which an aluminum material front plate 21a and a back plate 21c having a thickness of about 1 mm are stacked on the front and back of an aluminum material middle plate 21b having a thickness of about 2 mm. When the layered base material 21 is pressed and YAG laser beam is is emitted from the heads 9 and 19, fusion pools 32 and 33 are created, and the front plate 21a is welded to the middle plate 21b, and the back plate 21c is welded to the middle plate 21b, as shown in FIG. 5A and FIG. 5C. By driving the heads 9 and 19 in the y direction, or by driving the layered base material 21 in the y direction, welding can be performed linearly and continuously. At this time, since the skirting rollers 8 and 18 rotate, movement resistance is small, and the layered base material 21 can be pressed by large forces. This pressing and sandwiching inhibits deformation in the respective front plate 21a, middle plate 21b, and back plate 21c. Furthermore, since the gap between the front plate 21a and the middle plate 21b and the gap between the back plate 21c and the middle plate 21b are eliminated, a finely layered and welded lamination can be obtained.

Figure 5D:
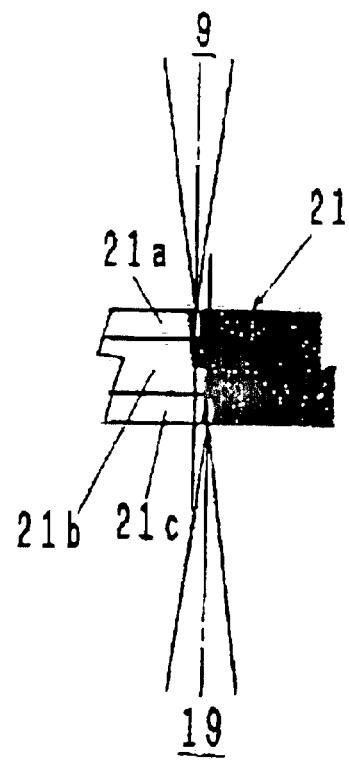

When the interface width of a welding portion is increased, thus penetration by melting becomes deep, it can be understood that the fusion pool formed by the laser beam of the head 9 and the fusion pool formed by the laser beam of the head 19 continues in a vertical direction so that a hole that both laser beams form passes through the layered base material 21, whereby dangling of fused metal and penetration of the laser beam occur. Therefore, in the case where the depths of fusion from the front side and from the back side are superimposed in the superimposed z direction, target positions of the first laser beam emitting head 9 and the second laser beam emitting head 19 are shifted in the x direction which is perpendicular to the superimposed z direction so that fusion positions from the front side and the back side are not superimposed as shown in FIG. 5B and FIG. 5D. Thus, strong lamination welding in which the interface width of the welding portion is large can be realized.

Second Embodiment

Figure 2:
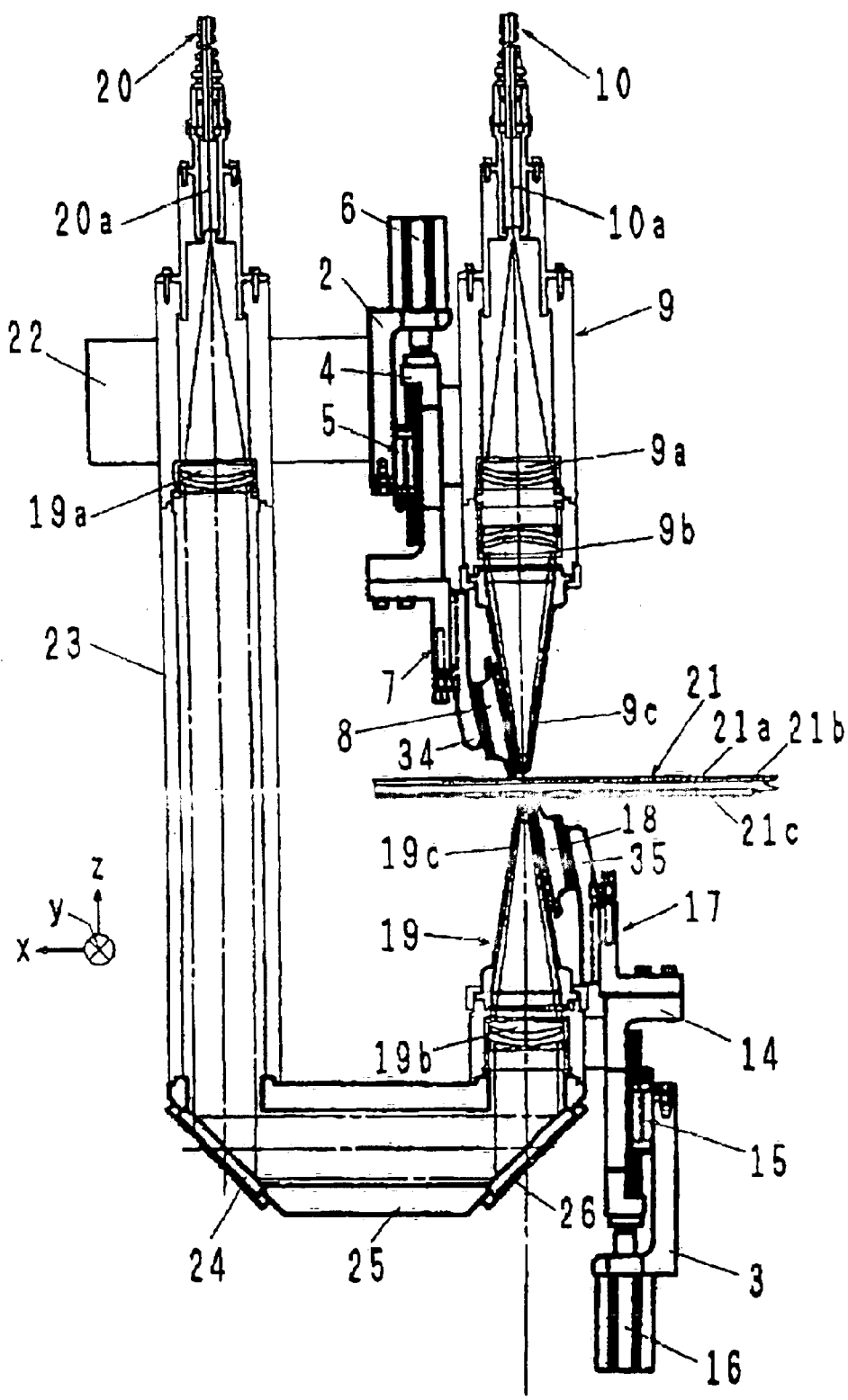
FIG. 2 is a vertical cross-sectional view of a second embodiment of the invention.

In a second embodiment shown in FIG. 2, the cable 20 transmitting the laser beam to the second laser beam emitting head 19, the lens 19a of the optical system making the laser beam emitted from the cable parallel, and one end of a telescopic expansion cylinder 23, are supported by means of a supporting base holder 22 supporting the first supporting member 4, and the direction of the laser beam at the other end of the expansion cylinder is changed 90 degrees by means of a total reflection mirror 24 and is further changed 90 degrees by means of another total reflection mirror 26 so as to be guided to the lens 19b of the convergence optical system of the second laser beam emitting head 19. In an embodiment in which the layered base material 21 is transferred in the y direction, the upper base holder 22 and the base holder coupling frame 3 are fixed on a fixture of the device. In the case where the heads 9 and 19 are driven in the y direction, such as in the case in which the heads are, for example, supported by a robot arm, the upper base holder 22 and the base holder coupling frame 3 are fixed on a supporting frame or an arm. Other structures are similar to those of the first embodiment.

In this second embodiment, since the laser welding device is constructed in such a way that both the optical fiber cables 10 and 20 transmitting the laser beam should only be lowered up to a height of the base holder coupling frame 2 above the layered base material 21 as shown in FIG. 2, the construction of the cable 20 is simple.

Third Embodiment

Figure 3:
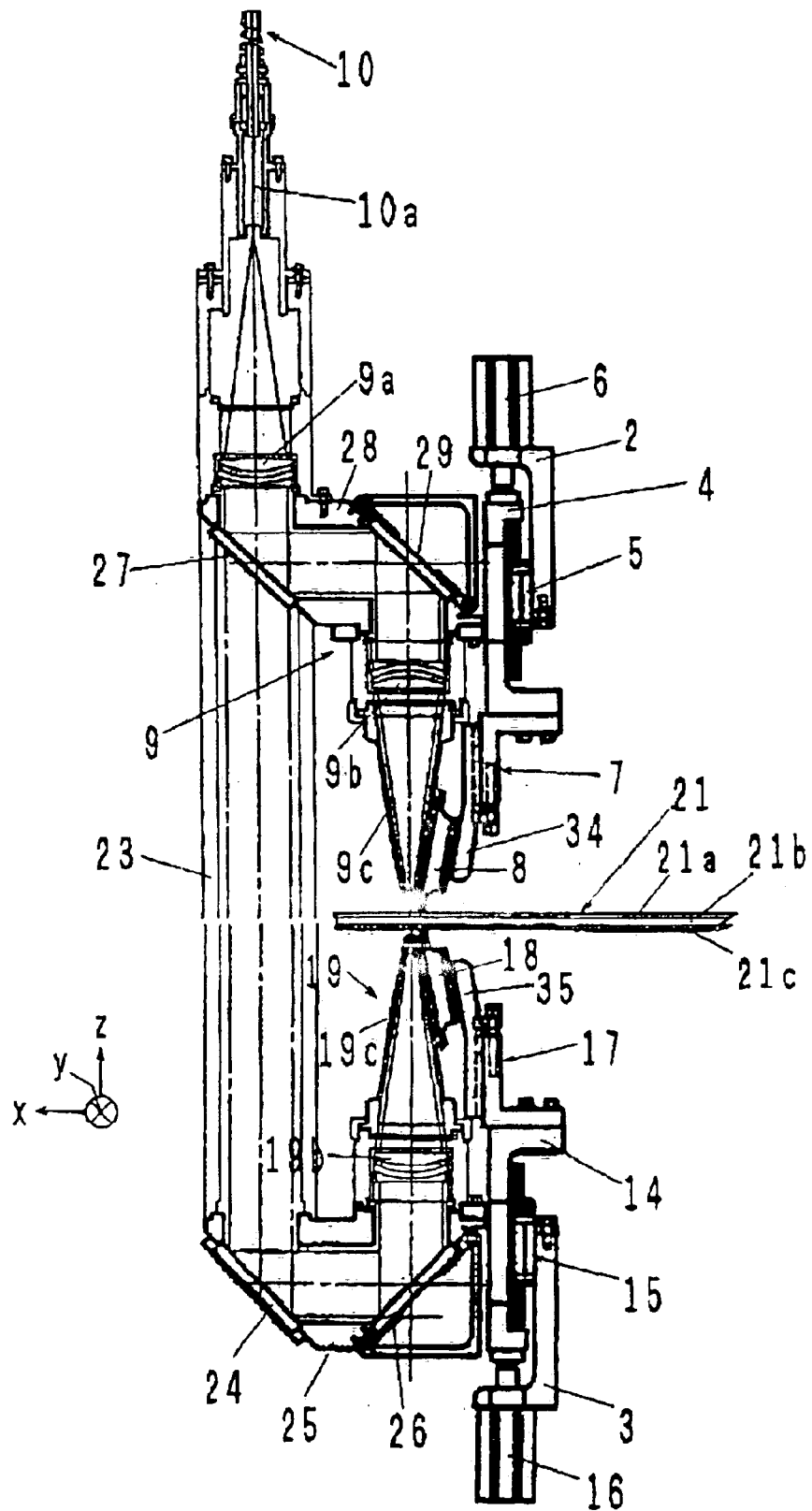
FIG. 3 is a vertical cross-sectional view of a third embodiment of the invention.

In a third embodiment shown in FIG. 3, the laser beam emitted from the laser beam transmitting cable 10 is made substantially parallel by means of the lens 9a of the optical system, and the direction of a part of it is changed 90 degrees by means of a half mirror 27 and is further changed 90 degrees by means of another total reflection mirror 29 so that the laser beam is guided to the lens 9b of the convergence optical system of the first laser beam emitting head 9. The direction of the laser beam which has passed through the half mirror 27 is then changed 90 degrees by means of the total reflection mirror 24 and is further changed 90 degrees by means of another total reflection mirror 26 so that the laser beam is guided to the lens 19b of the convergence optical system of the second laser beam emitting head 19. In an embodiment in which the layered base material 21 is-transferred in the y direction, the base holder coupling frames 2 and 3 are fixed on a fixture of the device. In the case where the heads 9 and 19 are driven in the y direction such as in the case where the heads are for example supported by a robot arm, the base holder coupling frames 2, 3 are fixed on a supporting frame or an arm. Other structures are similar to those of the first embodiment.

In this third embodiment, since the laser welding device is constructed in such a way that laser beam is supplied to the first and second laser beam emitting head (9, 19) by means of one laser beam transmitting cable 10, disposing the cable which transmits a YAG laser beam becomes simple.

Fourth Embodiment

Figure 4:
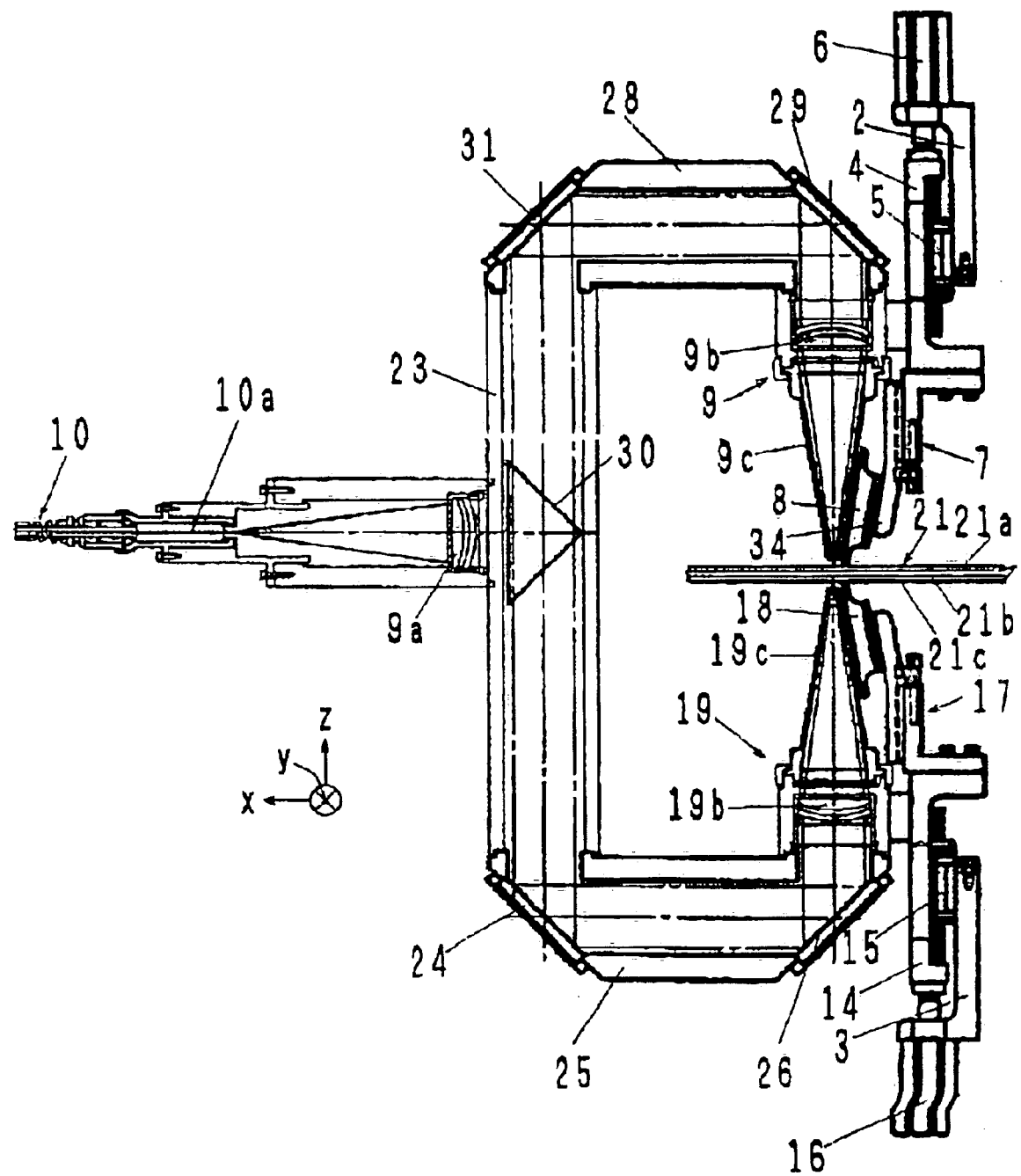
FIG. 4 is a vertical cross-sectional view of a fourth embodiment of the invention.

In a fourth embodiment shown in FIG. 4, the YAG laser beam emitted from the laser beam transmitting cable 10 is divided into two by means of a prism 30 of a beam splitter, where the direction of one laser beam is changed 90 degrees by a total reflection mirror 31 and is further changed 90 degrees by means of another total reflection mirror 29 so that the laser beam is guided to the lens 9b of the convergence optical system of the first laser beam emitting head 9 and the direction of the other laser beam is changed 90 degrees by a total reflection mirror 24 and is further changed 90 degrees by means of another total reflection mirror 26 so that the laser beam is guided to the lens 19b of the convergence optical system of the second laser beam emitting head 19. In this fourth embodiment also, in an embodiment in which the layered base material 21 is transferred in the y direction, the base holder coupling frames 2 and 3 are fixed on a fixture of the device. In the case where the heads 9 and 19 are driven in the y direction, such as in the case where the heads are, for example, supported by a robot arm, the base holder coupling frames 2 and 3 are fixed on a supporting frame or an arm. Other structures are similar to those of the first embodiment.

In this fourth embodiment, since the laser welding device is constructed in such a way that laser beam is supplied to the first and second laser beam emitting heads 9 and 19 by means of one laser beam transmitting cable 10, disposing the cable is simple.

What is claimed is:

1. A laser welding device comprising:

a first laser beam emitting head directed to a layered base material composed of two or more layers in a superimposed direction;

a first skirting roller rotatably supported by means of a first supporting member on which the first laser beam emitting head is fixed and provided with a peripheral surface which protrudes more at a base material side than a base material opposing end of the first laser beam emitting head;

a second laser beam emitting head directed to the layered base material from the opposite side of the first laser beam emitting head in the superimposed direction;

a second skirting roller rotatably supported by means of a second supporting member on which the second laser beam emitting head is fixed and provided with a peripheral surface which protrudes more at a base material side than a base material opposing end of the second laser beam emitting head; and a first pressing means for pressing the first supporting member with respect to a supporting base holder in the superimposed direction.

2. The laser welding device as set forth in claim 1, further comprising a first head gap adjustment mechanism adjusting the position of a first roller supporting member which rotatably supports the first skirting roller in the superimposed direction with respect to the first supporting member and a second head gap adjustment mechanism adjusting the position of a second roller supporting member which rotatably supports the second skirting roller in the superimposed direction with respect to the second supporting member.

3. The laser welding device as set forth in claim 1, further comprising a second pressing means for pressing the second supporting member with respect to the base holder in the superimposed direction.

4. The laser welding device as set forth in claim 1, wherein the first supporting member is supported by means of one end of a U-shape supporting base holder and the second supporting member is supported by means of the other end thereof.

5. The laser welding device as set forth in claim 1, wherein a cable which transmits a laser beam to the second laser beam emitting head, an optical system which makes the laser beam emitted from the cable parallel, and one end of an expansion cylinder are supported by means of a supporting base holder which supports the first supporting member, and wherein the direction of the laser beam is changed 90 degrees by means of a mirror at the other end of the expansion cylinder and is further changed 90 degrees by means of another mirror so that the laser beam is guided to a convergence optical system of the second laser beam emitting head.

6. The laser welding device as set forth in claim 1, wherein a laser beam emitted from a laser beam transmitting cable is made substantially parallel by means of an optical system, the direction of a part thereof is changed 90 degrees by means of a half mirror and is further changed 90 degree by means of another mirror so that the laser beam is guided to a convergence optical system of the first laser beam emitting head, and the direction of laser beam which has passed through the half mirror is changed 90 degrees by means of a mirror and is further changed 90 degrees by means of another mirror so that the laser beam is guided to a convergence optical system of the second laser beam emitting head.

7. The laser welding device as set forth in claim 1, wherein a laser beam emitted from a laser beam transmitting cable is divided into to beams by means of a beam splitter, the direction of one laser beam is changed 90 degrees by means of a mirror and is further changed 90 degrees by another mirror so that the laser beam is guided to an convergence optical system of the first laser beam emitting head, and the direction of the other laser beam changed 90 degrees by means of a mirror and is further changed 90 degrees by another mirror so that the laser beam is guided to a convergence optical system of the second laser beam emitting head.

* * * * *